Oct. 15, 1957 J. E. BROOK 2,809,784
EXPONENTIAL COMPUTER
Filed Sept. 24, 1953

INVENTOR.
JAMES E. BROOK
BY
Geo. G. Hyde
ATTORNEY

United States Patent Office 2,809,784
Patented Oct. 15, 1957

2,809,784

EXPONENTIAL COMPUTER

James E. Brook, Hackensack, N. J., assignor to Bendix Aviation Corporation, Teterboro, N. J., a corporation of Delaware Application September 24, 1953, Serial No. 382,122

11 Claims. (Cl. 235—61)

This invention relates to electrical computing apparatus and especially to an arrangement for computing the numerical values of certain algebraic exponential expressions. The main object is to provide an electrical system that will compute directly a considerable variety of exponential values, and more specifically solutions of the equations $x=z^3$, $z=x^{1/3}$, $y=x^{2/3}$, $x=y^{3/2}$, $y=z^2$, $z=y^{1/2}$.

An important object is to provide a computing apparatus that will compute such values directly and without approximations. Another purpose is to provide an arrangement of this type that is simple and compact, and which uses standard instrumentalities that are well developed and reliable. A specific object is the use of resolvers and a servomotor combined in a compact unit for the indicated purposes.

The invention comprises electrical computing apparatus including three variable transformers, such as the type of synchro ordinarily known as resolvers, whose rotors are interconnected for uniform rotation while maintaining the same angle relative to the stators, as by the servo. Cross circuits connect windings of the first and second transformers and of the second and third transformers, with an input connection to the first transformer and a unit voltage input to the last transformer.

The values of the various factors in the above equations are represented by voltages at the input circuit and by voltages across the first and second transformers. With the indicated connections, by adjusting the input voltages to produce the desired value for one of the factors, the solution to the equation will be represented by one of the voltages mentioned. The specific relationships are hereinafter set forth in detail.

These and other objects, purposes and advantages of the invention will appear more fully from the following detailed description, considered in conjunction with the accompanying drawing, in which one embodiment of the invention is illustrated. It is to be expressly understood, however, that the drawing is for purposes of illustration and description only, and is not to be construed as defining the limits of the invention.

Figure 1:
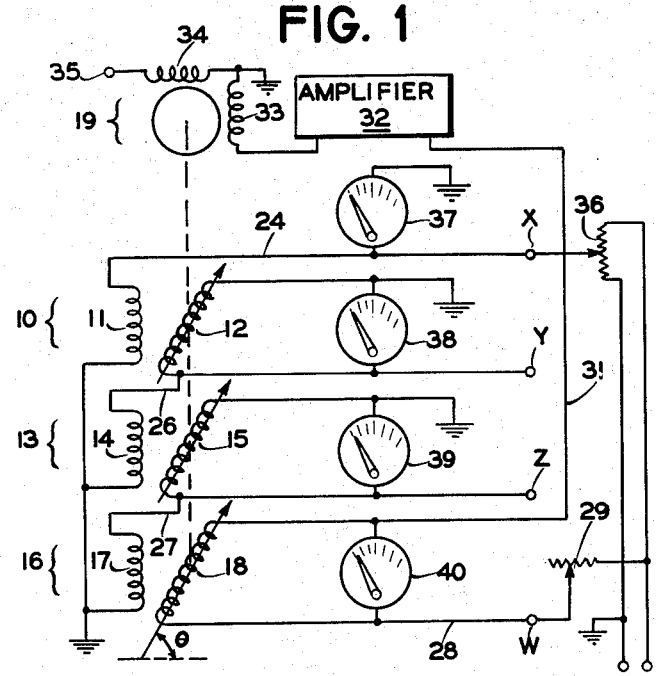
Fig. 1 is a schematic of a circuit embodying the invention.

The operation of the computer is based upon the fact that when a voltage is applied to one winding of a variable transformer, such as a resolver type synchro having a stator and a rotor, the voltage across the other winding will equal the applied voltage multiplied by a function of the angle of rotation of the rotor from the position where it is electrically parallel to the stator. This function is usually the sine of the angle, though the computer will operate with variable transformers in which the relationship is represented by other functions, as long as such functions vary identically with respect to the angle of rotation.

This principle is utilized for the indicated purposes by employing a first resolver 10 having a stator 11 and a rotor 12, a second resolver 13 having a stator 14 and a rotor 15, and a third resolver 16 having a stator 17 and a rotor 18. The rotors 12, 15 and 18 are connected to a common drive arranged so that the rotors revolve at the same angular rate from a common position in which each rotor is electrically parallel to its respective stator. In the form illustrated, this driving arrangement includes a servomotor 19 having its shaft connected to the shafts of rotors 12, 15 and 18 for rotation as a unit. In the form illustrated in Fig. 2, this is accomplished by mounting servomotor 19 on the uppermost of the platforms 20, supported by frame 21 on base 22, the resolvers 10, 13 and 16 being mounted on the other platforms and base with their rotor axes in alignment with the rotor of servo 19 and their shafts connected to form an integral common drive shaft 23.

Referring to Fig. 1, an input circuit 24 connects the input terminal $x$ with one end of stator 11 of the first resolver 10. Rotor 12 is connected at one end to ground, and at the other end to a terminal $y$ and to the first transfer circuit 26 extending to one end of stator 14 of the second resolver 13. Rotor 15 thereof is connected at one end to ground, and at the other end to terminal $z$ and to the second transfer circuit 27 connecting with one end of stator 17 of the third resolver 16. The other ends of stators 11, 14 and 17 are grounded.

One end of rotor 18 is connected through the second input circuit 28 to the second input terminal $w$ and a source of unit value voltage. In the form shown this comprises rheostat 29, connected to one side of a source of alternating current 30, the other side of which is grounded. The other end of rotor 18 is connected through motor circuit 31 and amplifier 32 to a field 33 of induction motor 19, the other field 34 of which is connected to a suitable energy source 35.

In operation, a suitable alternating voltage is applied to input terminal $x$ from any suitable source, such as potentiometer 36 connected across source 30. The voltage of the input can be indicated by connecting a voltmeter type indicator 37 between input circuit 24 and ground as shown. The voltage induced in rotor 12 will be applied to terminal $y$ and can be read on a similar indicator 38, connected between the latter terminal and ground. The voltage at terminal $y$ is applied through the first transfer circuit 26 to stator 14 of the second resolver 13, inducing a voltage in rotor 15 which appears at terminal $z$ and can be read on similar indicator 39, connected between the latter terminal and ground.

The voltage at terminal $z$ is applied through the second transfer circuit 27 to stator 17 of the third resolver 16. A voltage is applied from terminal $w$ to the rotor 18 of the latter resolver, as already indicated; and the resultant of this applied voltage and the voltage induced in rotor 18 by stator 17 will be amplified in amplifier 32 sufficiently to energize motor 19, which will rotate shaft 23 and rotors 11, 15 and 18 until the voltage induced in rotor 18 from stator 17 is equal and opposite in phase to the unit voltage applied from terminal $w$. At this angle of rotation no further energy will be applied to the motor 19, which will stop.

In this position the voltages at the terminals $x$, $y$ and $z$ will have the desired relationships, as shown by the following mathematical analysis, based on the fact that the voltage induced in each rotor is equal to the stator voltage multiplied by the sine of the angle of rotation $\theta$; consequently $$y = x \sin \theta$$
$$z = y \sin \theta$$
$$w = z \sin \theta$$
$$\sin \theta = y/x = z/y = w/z$$

It will be evident that while the sine function ordinarily is appropriate, the relationships of the voltages are not dependent upon the use of a resolver which produces a uniform sine relationship.

Analyzing the above equations:

$$z/y = w/z$$

If $w = 1$ $$y = z^2 \quad (1)$$
$$z = y^{1/2} \quad (2)$$
$$y/x = z/y$$
$$y^2 = zx$$
$$z^4 = zx$$
$$x = z^3 \quad (3)$$
$$z = x^{1/3} \quad (4)$$
$$y^{1/2} = x^{1/3}$$
$$y = x^{2/3} \quad (5)$$
$$x = y^{3/2} \quad (6)$$

Illustrating the operation of the system, if the square of a given number is desired, the voltage at $x$ is adjusted until a voltage having the value of the number appears at $z$, whereupon a voltage having a value corresponding to the square of the number will appear at $y$. If the square root of a number is desired, the voltage at $x$ is adjusted until the voltage value at $y$ corresponds to the number, whereupon the voltage value at $z$ will correspond to the square root.

If the cube of a number is desired, the voltage at $x$ is adjusted until the voltage value at $z$ corresponds to the number, the voltage value at $x$ then corresponding to the cube of the number. If the cube root of a number is to be determined, the voltage value at $x$ is adjusted to correspond to the number, and the voltage value at $z$ will correspond to the cube root.

If the problem is to determine the cube root of the square of a number, the voltage value at $x$ is made equal to the number, whereupon the voltage value at $y$ will correspond to the cube root of the square of that number. To find the square root of the cube of a number, adjust the input voltage at $x$ until the voltage value at $y$ is equivalent to the number, whereupon the voltage value at $x$ will be equivalent to the square root of the cube of such number.

It will of course be understood that while the system may be calibrated so that the values may be read directly in voltages, this is not essential, since any uniform fraction or multiple of the voltage value may be employed.

Where other combinations of the above exponential factors appear in an equation, they may be determined in two stages in obvious manner.

The circuit that has been described is particularly adapted for use in computing systems in which the voltages applied to the present system are derived from preliminary portions of the computing circuit. In this use the voltage representing the solution is taken from terminal $x$, $y$, or $z$ to a subsequent part of the computing system. Where the computation is based on a given value of $y$ or $z$, the values for these factors may be applied directly to the corresponding terminals. In such a system the indicators 37, 38 and 39 may be dispensed with, or may be used simply for viewing the operation. The indicator 40 is useful only to be certain that the unit value input has the exact voltage required, which may be one volt or any other voltage which is mathematically convenient for utilizing the full range of the indicators.

Figure 2:
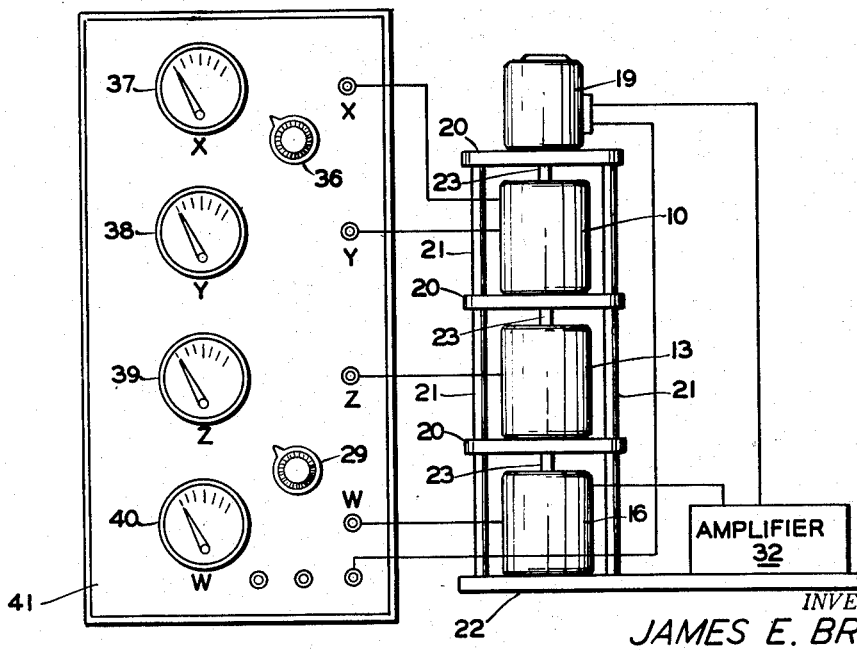
Fig. 2 is a side elevation of a computing unit, with the panel offset and the wiring diagrammatically illustrated in part.

An illustrative physical embodiment of the circuit is shown in Fig. 2, with the amplifier 32 mounted on base 22; panel 41, shown for convenience at the left, is normally affixed to said base. The panel elements are numbered to correspond with the circuit elements of Fig. 2. After rheostat 29 is adjusted to provide the proper unit voltage, as shown on indicator 40, rheostat 36 may be manipulated in the manner described to obtain the results of the various computations, which can be read on indicators 37, 38 and 39 as the case may be.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. Electrical computing apparatus comprising three variable transformers, each including a stator having a winding and a rotor having a winding, the rotors being interconnected to maintain the same angular relationship to the stators during rotation, an input circuit for a winding of the first transformer, arranged to apply a voltage corresponding to the value of a factor in an equation, a first voltage transfer circuit connecting the other winding of the first transformer to a winding of the second transformer, a second voltage transfer circuit connecting the other winding of the second transformer to a winding of the third transformer, a second input circuit connected to the other winding of the third transformer, arranged to apply to the latter winding a voltage having unit value in the equation, and means for simultaneously rotating the rotors to bring the third transformer to null position, whereby the values of the voltages across said other windings of the first and second transformers will have determined exponential relationships to each other and to said factor.

2. Electrical computing apparatus comprising three variable transformers, each including a stator having a winding and a rotor having a winding, an input circuit for a winding of the first transformer, arranged to apply a voltage corresponding to the value of a factor in an equation, a first voltage transfer circuit connecting the other winding of the first transformer to a winding of the second transformer, a second voltage transfer circuit connecting the other winding of the second transformer to a winding of the third transformer, a second input circuit connected to one end of the other winding of the third transformer, arranged to apply to the latter winding a voltage having unit value in the equation, and means for simultaneously rotating the rotors to bring the third transformer to null position, comprising a motor having a drive connection with the rotors of all three transformers, arranged to rotate said rotors through equal angles from the same angular position relative to the stators, and a motor energizing circuit connecting the motor and the other end of the latter third transformer winding, whereby the values of the voltages across said other windings of the first and second transformers will have determined exponential relationships to each other and to said factor.

3. Electrical computing apparatus comprising three resolver synchros, each including a stator having a single phase winding and a rotor having a single phase winding, each rotor being mounted on a shaft, a motor having a shaft, drive connections between the motor shafts and the rotor shafts arranged to maintain the same angle between each rotor and stator during rotation, a first input circuit connected to the stator winding of the first synchro, a first transfer circuit connecting the rotor winding of the first synchro and the stator winding of the second synchro, a second transfer circuit connecting the rotor winding of the second synchro with the stator winding of the third synchro, a second input circuit connected to one end of the rotor winding of the third synchro, and a motor energizing circuit connecting the other end of the latter winding with the motor, whereby the motor and synchro rotors will stop when the third synchro is in null position.

4. Electrical computing apparatus as claimed in claim 3, in which the motor and synchro rotors are coaxially arranged with the shafts connected end to end to form an integral drive shaft.

5. Electrical computing apparatus for solving an equation having two factors, one of which equals an exponential value of the other, comprising a first variable transformer having a pair of relatively movable inductances with one of its inductances connected to receive a first alternating voltage having a value corresponding to one factor, a second variable transformer having a pair of relatively movable inductances with one of its inductances connected to the other inductance of the first transformer and receiving the resulting voltage therefrom, a third variable transformer having a pair of relatively movable inductances with one of its inductances connected to the other inductance of the second transformer and receiving the resulting voltage therefrom, the other inductance of said third transformer being connected to an alternating voltage source, means for relatively moving the inductances of the third transformer to null position, and for moving the inductances of the first and second transformers to corresponding angular positions, whereby the voltages induced in said other inductances of said first and second transformers will have values having an exponential relationship to each other and to the value of said first voltage.

6. Apparatus as described in claim 5 in which the equation is in the form $x=z^3$, including means for applying a first voltage having a value corresponding to $x$ when the voltage across the other inductance of the second transformer has a value corresponding to $z^3$.

7. Apparatus as described in claim 5 in which the equation is in the form $z=x^{1/3}$, including means for applying a first voltage having a value corresponding to $x^{1/3}$ when the voltage across the other inductance of the second transformer has a value corresponding to $z$.

8. Apparatus as described in claim 5 in which the equation is in the form $y=x^{2/3}$ including means for applying a first voltage having a value corresponding to $x^{2/3}$ when the voltage across the other inductance of the first transformer has a value corresponding to $y$.

9. Apparatus as described in claim 5 in which the equation is in the form $x=y^{3/2}$, including means for applying a first voltage having a value corresponding to $x$ when the voltage across the other inductance of the first transformer has a value corresponding to $y$.

10. Apparatus as described in claim 5 in which the equation is in the form $y=z^2$, including means for applying a voltage across the other inductance of the first transformer having a value corresponding to $y$ when the voltage across the other inductance of the second transformer has a value corresponding to $z$.

11. Apparatus as described in claim 5 in which the equation is in the form $z=y^{1/2}$, including means for applying a voltage across the other inductance of the second transformer having a value corresponding to $z$ when the voltage across the other inductance of the first transformer has a value corresponding to $y$.

References Cited in the file of this patent
UNITED STATES PATENTS

| | | |
|---|---|---|
| 2,598,250 | Gehman | May 27, 1952 |
| 2,625,327 | Agins | Jan. 13, 1953 |